(12) United States Patent
Johnsgard et al.

(10) Patent No.: US 7,794,678 B2
(45) Date of Patent: *Sep. 14, 2010

(54) EFFLUENT GAS SCRUBBING

(75) Inventors: Mark Johnsgard, Campbell, CA (US); Kris Johnsgard, Los Gatos, CA (US)

(73) Assignee: Airgard, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/567,459

(22) Filed: Sep. 25, 2009

(65) Prior Publication Data

US 2010/0015021 A1    Jan. 21, 2010

Related U.S. Application Data

(63) Continuation of application No. 11/891,075, filed on Aug. 8, 2007, now Pat. No. 7,611,684.

(60) Provisional application No. 60/836,905, filed on Aug. 9, 2006.

(51) Int. Cl.
*B01D 53/34* (2006.01)
*B01D 53/74* (2006.01)

(52) U.S. Cl. .................. 423/210; 423/DIG. 5; 422/105; 422/108; 422/111; 422/168; 422/169; 422/170; 422/171

(58) Field of Classification Search .......... 423/210, 423/DIG. 5; 422/105, 108, 11, 168–171, 422/111
See application file for complete search history.

(56) References Cited

U.S. PATENT DOCUMENTS

| | | |
|---|---|---|
| 2,608,695 A | 9/1952 | Skibowski |
| 3,681,895 A | 8/1972 | Zirngibl et al. |
| 3,690,044 A | 9/1972 | Boresta |
| 3,888,955 A | 6/1975 | Maruko |
| 4,986,838 A | 1/1991 | Johnsgard |

(Continued)

FOREIGN PATENT DOCUMENTS

DE    20 45 021 A1    3/1975

(Continued)

OTHER PUBLICATIONS

U.S. Appl. No. 10/804,764, filed Mar. 19, 2004, Mark Johnsgard, Apparatus and Method for Providing Heated Effluent Gases to a Scrubber.

(Continued)

*Primary Examiner*—Timothy C Vanoy
(74) *Attorney, Agent, or Firm*—Carr & Ferrell LLP

(57) ABSTRACT

An effluent gas scrubber and a method of scrubbing effluent gases are provided. An inlet port receives an effluent gas. The gas passes through successive chambers in which it is sprayed with a scrubbing fluid. An oxidizer within the scrubbing fluid is effective to oxidize non-water soluble gases within the effluent gas. An oxidation-reduction potential probe measures the oxidation-reduction potential of the scrubbing fluid and adds the oxidizer to the scrubbing fluid as needed. A pH probe measures the pH of the scrubbing fluid and adds a base to the scrubbing fluid as needed to maintain the pH at or above a threshold such as pH 7, or pH 12.

26 Claims, 3 Drawing Sheets

U.S. PATENT DOCUMENTS

| | | | |
|---|---|---|---|
| 5,019,339 A | 5/1991 | Keeney et al. | |
| 5,271,908 A | 12/1993 | Shiban et al. | |
| 5,560,893 A | 10/1996 | Okino et al. | |
| 5,756,052 A | 5/1998 | Suzumura et al. | |
| 5,766,563 A | 6/1998 | Tanaka et al. | |
| 5,846,275 A | 12/1998 | Lane et al. | |
| 5,878,922 A | 3/1999 | Boring | |
| 5,927,957 A | 7/1999 | Kennedy et al. | |
| 5,935,283 A | 8/1999 | Sweeney et al. | |
| 6,029,100 A | 2/2000 | Iwashita et al. | |
| 6,084,148 A | 7/2000 | Shiban et al. | |
| 6,090,208 A | 7/2000 | Han | |
| 6,331,281 B1 | 12/2001 | Teru et al. | |
| 6,517,792 B2 | 2/2003 | Shimizu et al. | |
| 6,530,977 B2 | 3/2003 | Seeley et al. | |
| 6,759,018 B1 | 7/2004 | Arno et al. | |
| 7,316,721 B1 | 1/2008 | Redden et al. | |
| 7,524,473 B2 | 4/2009 | Lindau et al. | |
| 7,550,123 B2 * | 6/2009 | Temple et al. | 423/210 |
| 7,611,684 B2 * | 11/2009 | Johnsgard et al. | 423/210 |
| 7,635,501 B2 | 12/2009 | Komai et al. | |
| 2001/0001645 A1 * | 5/2001 | Lee et al. | 422/170 |
| 2001/0009652 A1 | 7/2001 | Arno | |
| 2004/0101460 A1 | 5/2004 | Arno et al. | |
| 2004/0202596 A1 | 10/2004 | Honjo et al. | |
| 2004/0213721 A1 | 10/2004 | Arno et al. | |
| 2005/0031500 A1 | 2/2005 | Feng | |
| 2005/0085057 A1 | 4/2005 | Hashikura et al. | |
| 2006/0104878 A1 | 5/2006 | Chiu | |
| 2007/0172398 A1 | 7/2007 | Clark | |
| 2008/0233024 A1 | 9/2008 | Lindau et al. | |

FOREIGN PATENT DOCUMENTS

| | | |
|---|---|---|
| EP | 0 429 942 A | 6/1991 |
| FR | 1 361 725 A | 5/1964 |
| GB | 1 328 990 A | 9/1972 |

OTHER PUBLICATIONS

U.S. Appl. No. 12/284,035, filed Sep. 17, 2008, Mark Johnsgard, Reactive Gas Control.

U.S. Appl. No. 12/429,597, filed Apr. 24, 2009, Mark Johnsgard, Apparatus and Method for Providing Heated Effluent Gases to a Scrubber.

Forderkennzeichen: 254 116 98. Thema: Verfahrensentwicklung zur Herstellung von Solar-Silicium im halbtechnischen Mabstab (Process Development for Manufacturing of Solar Silicon in Semi-Technical Scale), R. Kummel, & J. Danzig, Fraunhofer Institute Annual Report (Jun. 2002).

* cited by examiner

EFFLUENT GAS SCRUBBING

CROSS-REFERENCE TO RELATED APPLICATIONS

This application is a Continuation of and claims the benefit of U.S. patent application Ser. No. 11/891,075, now U.S. Pat. No. 7,611,684, filed Aug. 8, 2007 and titled "Effluent Gas Scrubber and Method of Scrubbing Effluent Gasses," which claims the benefit of U.S. Provisional Patent Application No. 60/836,905 filed on Aug. 9, 2006 and titled "Apparatus and Method for Oxidizing Pollutants in Effluent Gas Streams," each of which is incorporated herein by reference. This application is generally related to U.S. Pat. No. 4,986,838 titled "Inlet System for Gas Scrubber," issued to Johnsgard on Jan. 22, 1991, and also incorporated herein by this reference.

BACKGROUND OF THE INVENTION

1. Field of the Invention

This invention relates generally to scrubbing of effluent gases and more particularly to scrubbing of gases that are not water soluble.

2. Description of the Prior Art

Various gases, some toxic and some highly corrosive or reactive, are used in semiconductor manufacturing processes. Scrubbers are used for cleansing any mixture of gases that remains at the conclusion of a manufacturing procedure. Most such scrubbers operate by passing the mixture of gases through a mist of a fluid such as water; these scrubbers are known as wet fume scrubbers. Some gases, of which a few examples are chlorine, fluorine and ammonia, are water soluble and are readily removed by this method. Other gases such as silane ($SiH_4$), arsine ($AsH_3$), phosphine ($PH_3$), and germane ($GeH_4$) are not water soluble. A shortcoming of wet fume scrubbers has been their inability to remove gases such as silane that are not water soluble.

Many water-insoluble gases are oxidizable and in principle can be disposed of with the assistance of an oxidizing agent such as oxygen. Various systems and methods based on the use of an oxidizing agent to remove water-insoluble gases have been proposed. Among these are U.S. Pat. No. 5,271,908 issued to Shiban et al. on Dec. 21, 1993, U.S. Pat. No. 6,084,148 issued to Shiban et al. on Jul. 4, 2000, U.S. patent application Ser. No. 09/957,424 filed Sep. 21, 2001 by Tong et al. and published Mar. 27, 2003 as Publication No. 2003/0057576, U.S. patent application Ser. No. 10/849,435 filed May 19, 2004 by Arno et al. and published Oct. 28, 2004 as Publication No. 2004/0213721, U.S. patent application Ser. No. 11/217,780 filed Sep. 1, 2005 by Tong et al. and published Jan. 5, 2006 as Publication No. 2005/0002380.

A 1998 German report bearing the identifier Forderkennzeichen 254 116 98 and titled "Verfahrensentwicklung zur Herstellung von Solar-Silicium im halbtechnischen" also addresses the problem. This last reference reports on a laboratory test of a benchtop replication of a scrubber. The test reported on the reaction of silane with sodium hydroxide or potassium hydroxide. Sodium hypochlorite was also added as an oxidation agent but showed no influence on the silane conversion. The report noted that small flames were observed in those experiments that employed sodium hypochlorite due to gas bubbles on the liquid surface. The report concluded, with respect to the use of sodium hypochlorite that adding sodium hypochlorite is dangerous because of the intense reaction with silane. Accordingly, there remains a need for a safe and economical way to scrub gases that are not water soluble from an effluent gas mixture.

SUMMARY

Briefly and in general terms, an effluent gas scrubber according to the invention has an inlet port for receiving an effluent gas, a first chamber that receives the gas from the inlet port, a second chamber that receives the gas from the first chamber, and an outlet port. Each chamber has a nozzle oriented to spray a scrubbing fluid. An oxidation-reduction potential (ORP) probe measures the oxidation-reduction potential of the scrubbing fluid and adds an oxidizer as needed to the scrubbing fluid. Likewise, a pH probe measures the pH of the scrubbing fluid and adds an acid or base to the scrubbing fluid as needed to maintain the pH at above or below a desired level. The desired level may be pH 7 or in some cases as much as pH 12 or higher. In some embodiments, an interior surface of a transition tube between the inlet port and the first chamber may be coated with a swirling fluid.

A method of scrubbing an effluent gas according to the invention includes adding an oxidizer to a reservoir of scrubbing fluid, spraying the scrubbing fluid through an effluent gas, measuring the oxidation-reduction potential and/or the pH of the scrubbing fluid, and adding oxidizer and/or a base to the scrubbing fluid. The oxidizer is effective to oxidize non-water soluble gases from the effluent gas that would not otherwise be removed by the scrubbing fluid. The base increases the pH of the washing solution, preferably to pH 7 or above, in some embodiments.

DETAILED DESCRIPTION OF THE INVENTION

There has been a need for a way to remove gases that are not water soluble from a flow of effluent gases. In an effluent gas scrubber embodying the invention, an effluent gas passes through successive chambers within which it is sprayed with a scrubbing fluid. An ORP probe measures the oxidation-reduction potential of the scrubbing fluid to control the addition of an oxidizer to the scrubbing fluid as needed to maintain the oxidizer concentration, so as to oxidize and thereby remove non-soluble gases such as silane. A pH probe can also be used to measure the pH of the scrubbing fluid to control the addition of a base to the scrubbing fluid to compensate for the acidification of the scrubbing fluid by the uptake of the various water-soluble gases. In some embodiments, an interior surface of a passage between the inlet port and the first chamber may be coated with a swirling fluid to reduce clogging. The swirling fluid prevents the nucleation and growth of condensation on the interior surface, and also produces little mist or vapor to support cooling and condensation.

Figure 1:
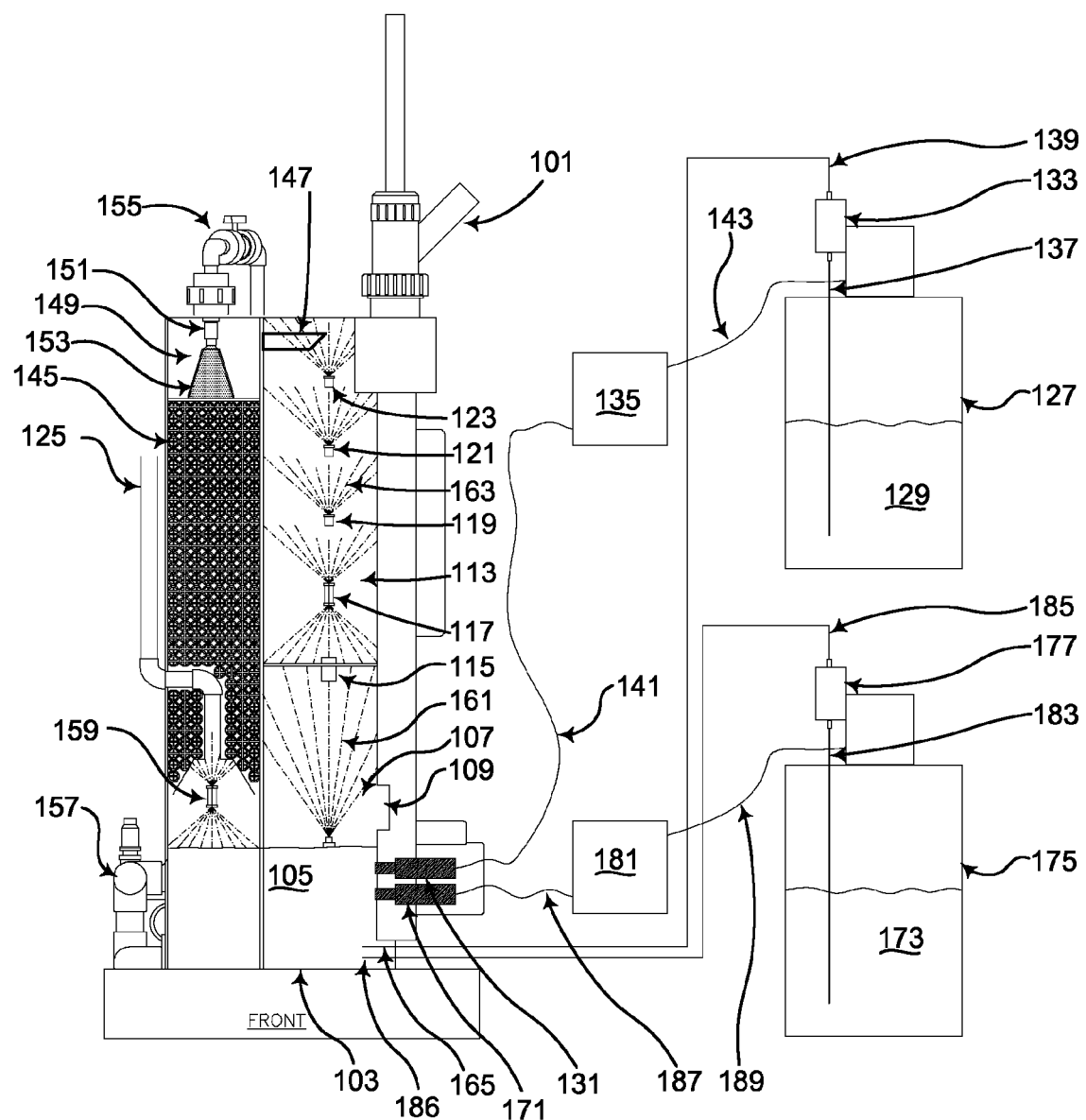
FIG. 1 is a schematic of a scrubber according to an exemplary embodiment of the invention.

Referring to FIG. 1, an effluent gas scrubber embodying the principles of the invention has an inlet port 101 that receives an effluent gas mixture for scrubbing. A scrubbing fluid reservoir 103 stores a scrubbing fluid 105. Water or some other suitable substance may be used as the scrubbing fluid. A first chamber 107 is in fluid communication with the inlet port 101 through an opening 109, and a nozzle 111 is oriented to spray fluid 105 from the scrubbing fluid reservoir 103 into the first chamber 107. A second chamber 113 is in fluid communication with the first chamber 107 through an opening 115, and a nozzle (shown as a plurality of individual nozzles 117, 119, 121 and 123) in the second chamber 113, in fluid communication with the scrubbing fluid reservoir 103, is oriented to spray fluid 105 from the scrubbing fluid reservoir 103 into the second chamber 113. An outlet port 125 is in fluid communication with the second chamber 113. Another embodiment may use only a packed bed and no spray chambers.

An oxidizer tank 127 stores an oxidizer 129. Exemplary oxidizers include hydrogen peroxide, potassium permanganate, sodium hypochlorite, oxygen, and ozone. As used herein, hydroxides such as sodium and potassium hydroxides, are expressly not oxidizers 129 but are instead bases. An ORP probe 131 measures the oxidation-reduction potential of the scrubbing fluid 105 in the scrubbing fluid reservoir 103 and, responsive to the measured potential, causes the oxidizer 129 to flow from the oxidizer tank 127 to the scrubbing fluid reservoir 103.

An oxidizer pump 133 may be used to pump oxidizer 129 from the oxidizer tank 127 to the scrubbing fluid reservoir 103 according to the potential measured by the ORP probe 131. For example, an oxidizer controller 135, responsive to the ORP probe 131, may be used to control the oxidizer pump 133. The oxidizer 129 flows through a suitable passage 137 from the oxidizer tank 127 to the oxidizer pump 133 and then to the scrubbing fluid reservoir 103 through a passage 139. The ORP controller 135 is connected to the ORP probe 131 through a lead 141 and to the oxidizer pump 133 through a lead 143. Instead of controlling the delivery of the oxidizer 129 by measuring the oxidation-reduction potential of the scrubbing fluid 105, the oxidizer 129 can optionally be added to the scrubbing fluid reservoir 103 at a preset rate that depends upon the type and flow rate of the gas to be oxidized. The oxidizer pump 133 can also be slaved to a gas flow controller and operated at a rate proportional to the effluent gas flow.

In a similar manner, a pH probe 171 measures the pH potential of the scrubbing fluid 105 in the scrubbing fluid reservoir 103 and, responsive to the measured pH, causes a base 173 to flow from a base tank 175 to the scrubbing fluid reservoir 103. A base pump 177 may be used to pump base 173 from the base tank 175 to the scrubbing fluid reservoir 103 according to the pH measured by pH probe 171. For example, a pH controller 181, responsive to the pH probe 171, may be used to control the base pump 177. The base 173 flows through a suitable passage 183 from the base tank 175 to the base pump 177 and then to the scrubbing fluid reservoir 103 through a passage 185. The pH controller 181 is connected to the pH probe 171 through a lead 187 and to the base pump 177 through a lead 189.

The pH controller 181 may engage the base pump 177 whenever it senses that the pH of the scrubbing fluid 105 has fallen below a predefined threshold. This can happen, for example, if the scrubbing fluid 105 becomes acidic as a result of water-soluble gases that enter the fluid 105 during the scrubbing process. In one embodiment it may be sufficient to maintain the pH at or above a level of pH 7. In another embodiment, for example, if the gases being scrubbed are very acidic, it may be desirable to maintain a pH of pH 12 or more. The pH control may be enhanced, in some instances, by means of a pre-scrubber chamber (not shown) with a separate scrubbing fluid to remove any strongly acidic gas such as HCl or chlorosilane. Generally, the pH of the scrubbing fluid 105 needs to be at pH 7 or above as a pH below pH 7 will prevent some oxidizers from being effective. Instead of controlling the delivery of the base 173 by measuring the pH of the scrubbing fluid 105, the base 173 can optionally be added to the scrubbing fluid reservoir 103 at a preset rate that depends upon the type and flow rate of the water-soluble gases to be scrubbed. The base pump 177 can likewise be slaved to the gas flow controller and operated at a rate proportional to the effluent gas flow.

Any suitable pumping device may be used as the oxidizer pump 133 or the base pump 177. Alternatively, the oxidizer 129 and base 173 may flow into the scrubbing fluid reservoir 103 by gravity, in which case any suitable valve can be used to control the flow of the oxidizer 129 or the base 173.

Location of the ORP probe 131 in the scrubbing reservoir 103, and selection of a point 165 at which the oxidizer 129 is injected into the scrubbing fluid reservoir 103, may be done such that the oxidizer 129 enters a pump 157 quickly for rapid dispersal through the scrubbing fluid 105 and the ORP probe 131 is exposed to the oxidizer 129 as soon as possible after injection. For example, the injection point 165 can be located near an inlet to the pump 157 and the ORP probe 131 located near an outlet of the pump 157. This allows for good mixing and fast feedback to the controller 135 for tighter control. Accurate metering of the oxidizer 129 allows the minimum effective concentration to be maintained, reducing the chance of a violent oxidizing reaction, especially with silane or germane gases. These same principles apply to the location of an injection point 186, at which base 173 can be injected into scrubbing fluid reservoir 103, and the location of pH probe 171, suitable for measuring the pH of scrubbing fluid 105.

Some embodiments employ a packed column 145. Gases can flow into the column 145 from the second chamber 113, for example through a passage 147. The column 145 can be filled with plastic spherical frames, for example, that offer a substantial area of wetted surface. The gases flow into the column 145 through an eductor 149. In the embodiment shown, the eductor 149 includes a high-flow, full-cone, narrow-spray nozzle 151 and a cone 153. The flow of scrubbing fluid 105 through the nozzle 151 and the cone 153 carries the effluent gases along with it and thereby lowers upstream gas pressure.

The nozzle 151 may receive scrubbing fluid 105 from the scrubbing fluid reservoir 103 through plumbing 155 connected to pump 157. The pump 157 may also provide scrubbing fluid to the other nozzles 111, 117, 119, 121 and 123. Preferably the pump 157 is constructed of corrosion-resistant materials for protection from corrosives that may build up in the scrubbing fluid 105.

Precipitate build up in the packed column 145 is avoided in two ways. First, by the time the effluent gases reach the packed column 145, most of the reactive gases have already been removed. Second, the nozzle 151 above the packed column supplies a sufficiently large flow of scrubbing fluid 105 to prevent solids from building up in the column 145.

After the effluent gases pass through the packed column 145, a final nozzle 159 sprays the gases as they enter the outlet port 125. Fresh water may be used for this final spray. The final nozzle 159 may include, in some embodiments, a plurality of full cone, fine spray nozzles. This fresh water spray gives the scrubbed gases one more wash of maximum absorption fresh water to ensure the highest possible scrubbing efficiency before the gases exit to the atmosphere. It also encircles the entrance to the exhaust outlet port 125 and prevents any foam that may have formed on the surface of the scrubbing fluid 105 in the scrubbing fluid reservoir 103 from exiting through the outlet port 125.

In one embodiment the nozzle 111 in the first chamber 107 may be a high-flow, large-droplet, full-cone-spray nozzle. A spray 161 of scrubbing fluid 105 from this nozzle 111, in addition to providing the first scrub of the effluent gases, keeps surfaces in the first chamber 107 flushed so as to prevent coating or deposits. The nozzles 117, 119, 121 and 123 may be low-flow, small-droplet nozzles that provide a spray 163 having a large surface area and traveling faster than the effluent gases, resulting in efficient scrubbing. In other embodiments, different kinds of nozzles may be used according to such factors as the types of gases being scrubbed and the physical configuration of the scrubber.

Figure 2:
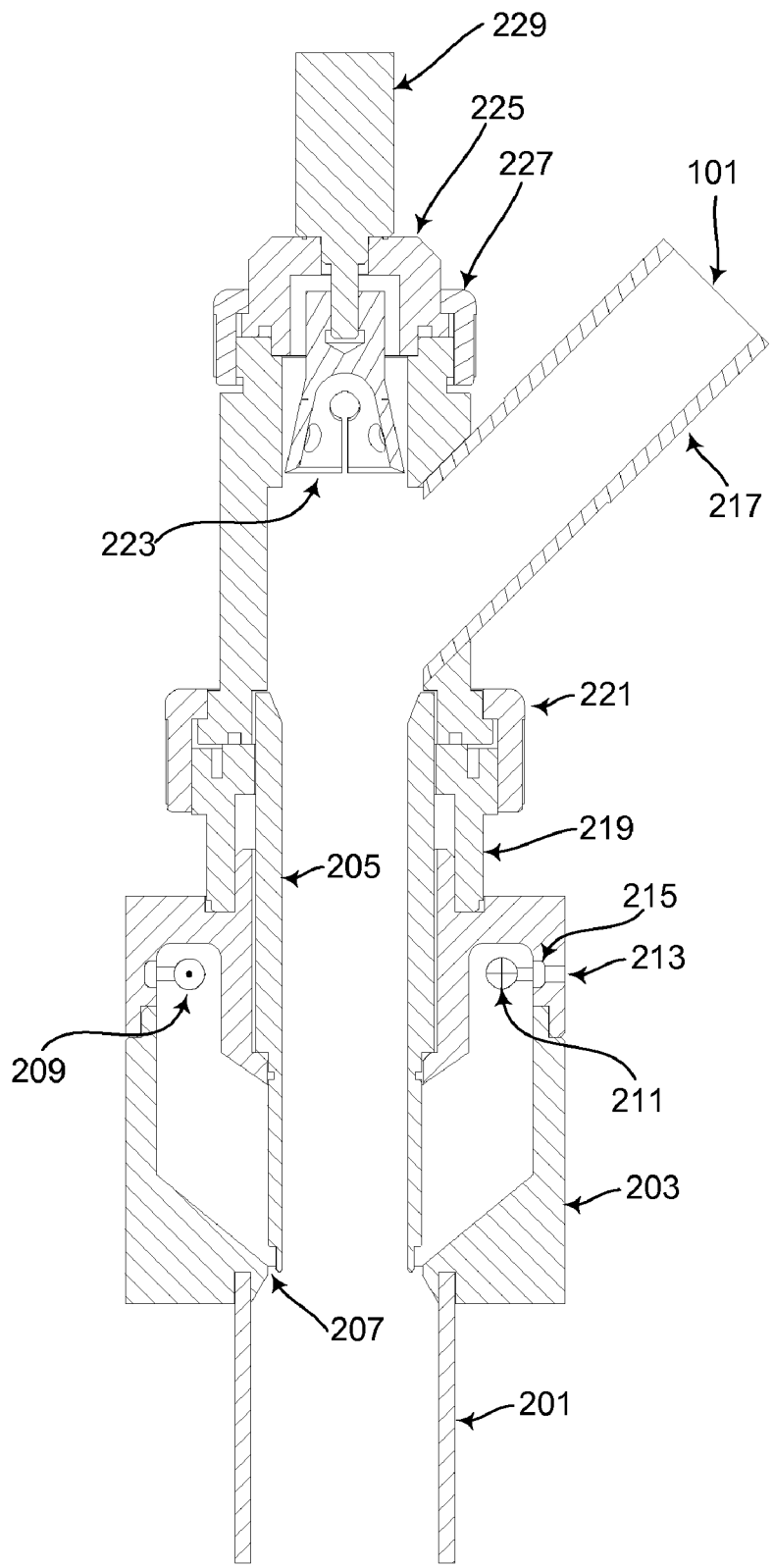
FIG. 2 is a cross-sectional view of a gas inlet port of the embodiment of FIG. 1.

As shown in FIG. 2, a transition tube 201 may be provided between the inlet port 101 and the first chamber 107. An input reservoir 203 surrounds an inlet pipe 205 adjoining the transition tube 201. A swirling fluid from the reservoir 203 is introduced into the transition tube 201 through an opening 207 such that interior surfaces of the transition tube 201 are coated with the swirling fluid.

In the embodiment shown in FIG. 2, a plurality of jets 209 and 211 are disposed in the reservoir 203 and receive fluid from a pump (not shown) through a fluid inlet 213 and an annular conduit 215. The fluid swirls around the reservoir and thence into the transition tube 201 through the opening 207. Other means than the jets might be used to swirl the fluid. For example, an impeller blade in the reservoir, activated for example by a drive shaft or a magnetic field, could make the fluid swirl. Or the fluid could be made to swirl by vibrating the reservoir 203 or by rotating the reservoir 203 or (if the fluid is electrically conductive) by a rotating magnetic field. In the embodiment shown, the reservoir 203 is coupled to a supply pipe 217 in which the inlet port 101 is located by a union 219 and a nut 221.

A plunger 223 may be held in a retainer 225 coupled to the supply pipe 217 by a nut 227, in some embodiments. The plunger 223 is disposed in a position from which it may be extended through the inlet pipe 205 as necessary for cleaning. The plunger 223 may be actuated manually by an actuator 229 or by electric or mechanical means (not shown) based on a visual inspection, a time interval, a backpressure measurement, or the like. A scraper, a file, or some other appropriate tool can also be used in place of the plunger 223 to remove deposits from the inlet pipe 205. Further details and alternative embodiments of the inlet port 101 and transition tube 201 are described in U.S. patent application Ser. No. 10/804,764 filed on Mar. 14, 2004 and titled "Apparatus and Method for Providing Heated Effluent Gases to a Scrubber," which is incorporated herein by reference.

Figure 3:
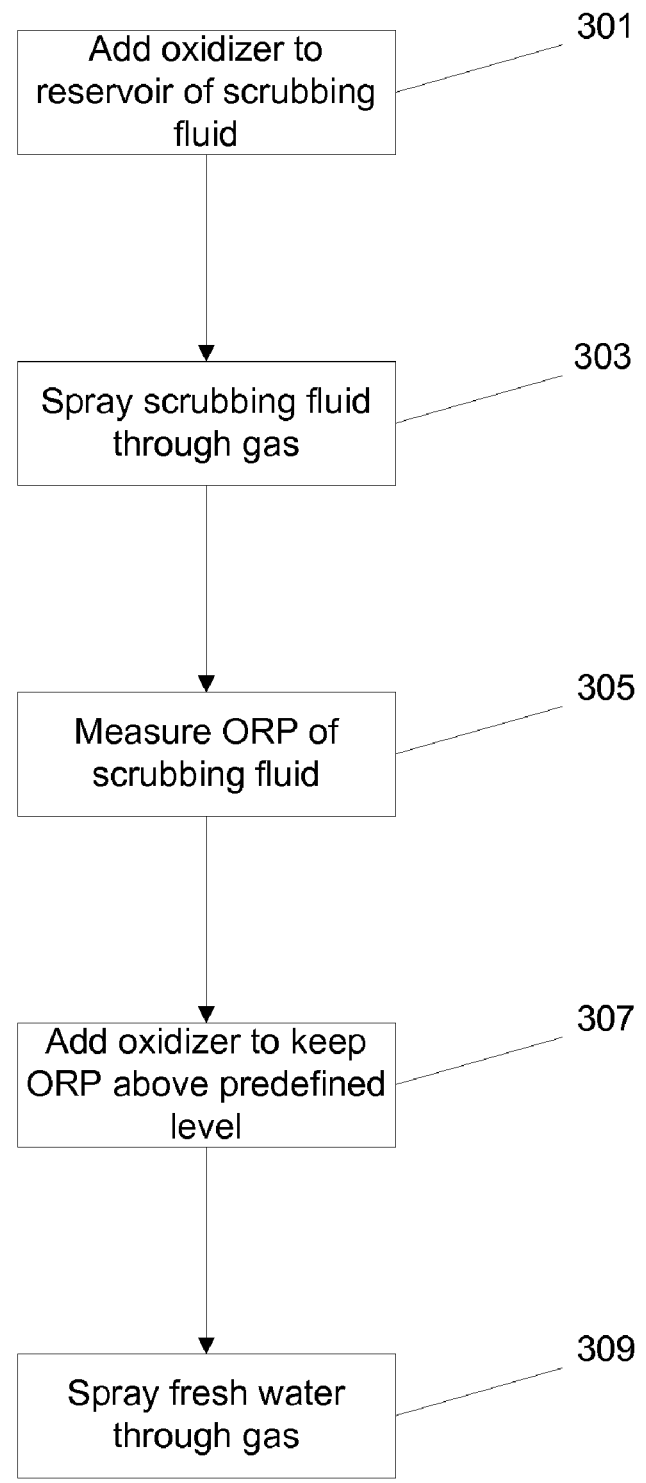
FIG. 3 is a flowchart of a method according to an exemplary embodiment of the invention.

An embodiment of a method of scrubbing an effluent gas according to the principles of the invention is illustrated in FIG. 3. The method begins by adding an oxidizer to a reservoir of scrubbing fluid (301). The scrubbing fluid is then sprayed through an effluent gas (303). Non-water soluble gases such as silane are readily oxidized by the oxidizer, while water soluble gases are removed by the scrubbing fluid. The oxidation-reduction potential of the scrubbing fluid is measured (305) and a sufficient quantity of oxidizer is added to the scrubbing fluid to maintain the oxidation-reduction potential (307). The pH of the scrubbing fluid may also be measured so that a sufficient quantity of base can be added to the scrubbing fluid to maintain the pH above a predefined threshold. In one embodiment the predefined pH threshold is about 7, and in another the predefined pH threshold is about 12. Other levels may be defined as desired. In some embodiments, the effluent gas is sprayed with fresh water after having been sprayed with the scrubbing fluid (309).

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. An effluent gas scrubber comprising:
    an inlet port;
    a scrubbing fluid reservoir;
    a first chamber in fluid communication with the inlet port via an inlet pipe;
    a plunger configured to be extendable through the inlet pipe to remove a deposit on an inner surface of the inlet pipe;
    a nozzle in the first chamber, in fluid communication with the scrubbing fluid reservoir and oriented to spray fluid from the scrubbing fluid reservoir into the first chamber;
    a second chamber in fluid communication with the first chamber;
    a nozzle in the second chamber, in fluid communication with the scrubbing fluid reservoir and oriented to spray fluid from the scrubbing fluid reservoir into the second chamber;
    a pH probe that measures the pH of a fluid in the scrubbing fluid reservoir and responsive to the measured pH causes an addition of an acid or a base to the fluid;
    an outlet port in fluid communication with the second chamber;
    an oxidizer tank; and
    an oxidation-reduction potential probe that measures the oxidation-reduction potential of fluid in the scrubbing fluid reservoir and responsive to the measured oxidation-reduction potential adds an oxidizer to the fluid.

2. The effluent gas scrubber as in claim 1 further comprising an oxidizer pump under control of the oxidation-reduction potential probe that adds oxidizer to the fluid.

3. The effluent gas scrubber as in claim 1 wherein the pH probe causes an addition of base if the pH is less than 7.

4. The effluent gas scrubber as in claim 1 wherein the pH probe causes an addition of base if the pH is less than 12.

5. The effluent gas scrubber as in claim 1 further comprising:
    a packed column defining a fluid path between the second chamber and the outlet port; and
    an eductor in the fluid path and in fluid communication with the scrubbing fluid reservoir and oriented to spray effluent gas from the second chamber and fluid from the scrubbing fluid reservoir into the packed column.

6. The effluent gas scrubber as in claim 1 further comprising:
    a transition tube between the inlet port and the first chamber;
    an input reservoir adjacent the transition tube; and
    means for introducing a swirling fluid from the reservoir into the transition tube such that an interior surface of the transition tube is coated with the swirling fluid.

7. The effluent gas scrubber as in claim 1, further comprising:
    a timer in communication with the plunger and configured to extend the plunger after a timed interval.

8. A scrubber for scrubbing an effluent gas using a scrubbing fluid, the scrubber comprising:
    a first chamber;
    an inlet port configured to deliver the effluent gas to the first chamber via a transition tube having an inner surface;

an input reservoir in fluid communication with the transition tube;

an opening between the input reservoir and the transition tube, the opening configured to deliver a fluid from the input reservoir to the transition tube in a manner that coats at least a portion of the inner surface with the delivered fluid;

a scrubbing fluid reservoir configured to deliver the scrubbing fluid to the first chamber;

a pH probe configured to measure the pH of the scrubbing fluid; and a tank configured to add an acid or a base to the scrubbing fluid in response to the measured pH.

9. The scrubber of claim 8, wherein the tank includes a base tank, and the base is added in response to a measured pH below 7.

10. The scrubber of claim 8, wherein the tank includes a base tank, and the base is added to the scrubbing fluid in response to a measured pH below 12.

11. The scrubber of claim 8, wherein the addition of the acid or base is at a preset rate.

12. The scrubber of claim 11, wherein the preset rate depends upon a flow rate of the effluent gas.

13. The scrubber of claim 8, further comprising an oxidation-reduction potential probe that measures the oxidation-reduction potential of the scrubbing fluid.

14. The scrubber of claim 13, further comprising an oxidizer pump to deliver an oxidizer to the scrubbing fluid, the oxidizer pump controlled by the oxidation-reduction potential probe.

15. The scrubber of claim 8, wherein the first chamber includes any of a packed bed and a packed column.

16. The scrubber of claim 8, further comprising a plunger configured to be extendable through the transition tube to remove a deposit on the inner surface.

17. The scrubber of claim 8, wherein the first chamber includes one or more nozzles configured to spray the scrubbing fluid into the first chamber.

18. The scrubber of claim 8, wherein the base includes one or more hydroxides.

19. The scrubber of claim 8, wherein the effluent gas includes a first gas that lowers the pH of the scrubbing fluid upon dissolution in the scrubbing fluid.

20. The scrubber of claim 8, further comprising a second chamber in fluid communication with the first chamber and configured to receive the effluent gas from the first chamber.

21. A method of scrubbing an effluent gas comprising:
receiving the effluent gas into a chamber via an inlet pipe having an inner surface;
adding a scrubbing fluid to the chamber;
scraping the inner surface to remove a deposit associated with any of the effluent gas and the scrubbing fluid; and
controlling a pH of the scrubbing fluid in response to the effluent gas.

22. The method of claim 21, wherein controlling includes adding an acid or a base to the scrubbing fluid.

23. The method of claim 22, wherein controlling includes measuring the pH of the scrubbing fluid, and the acid or base is added in response to the measured pH.

24. The method of claim 21, wherein controlling includes adding a base when the pH is below 12.

25. The method of claim 21, further comprising measuring an oxidation-reduction potential of the scrubbing fluid.

26. The method of claim 21, further comprising adding an oxidizer to the scrubbing fluid.

* * * * *